United States Patent [19]
Moffat et al.

[11] Patent Number: 5,526,148
[45] Date of Patent: Jun. 11, 1996

[54] APPARATUS AND METHOD FOR FULL-FIELD CALIBRATION OF COLOR RESPONSE TO TEMPERATURE OF THERMOCHROMIC LIQUID CRYSTALS

[76] Inventors: Robert J. Moffat, 18375 Corral Del Cielo, Salinas, Calif. 93908; Dino J. Farina, 79 Fessenden St., Newton, Mass. 02160

[21] Appl. No.: 284,367

[22] Filed: Aug. 2, 1994

[51] Int. Cl.⁶ .............................. G02F 1/136; G02F 1/13
[52] U.S. Cl. ................................................ 359/43; 359/44
[58] Field of Search .............................. 359/43, 44, 51; 356/402

[56] References Cited

U.S. PATENT DOCUMENTS

| | | | |
|---|---|---|---|
| 4,899,503 | 2/1990 | Baughman | 359/43 |
| 5,150,231 | 9/1992 | Iwamoto | 359/44 |
| 5,223,958 | 6/1993 | Berry | 359/43 |

FOREIGN PATENT DOCUMENTS

| | | | |
|---|---|---|---|
| 435343 | 7/1991 | European Pat. Off. | 359/43 |
| 1081612 | 3/1984 | U.S.S.R. | 359/43 |

*Primary Examiner*—Anita Pellman Gross
*Assistant Examiner*—Tiep H. Nguyen
*Attorney, Agent, or Firm*—Lumen Intellectual Property Services

[57] ABSTRACT

An apparatus and method for accurately calibrating the full-field color response to temperature of a thermochromic liquid crystal (12, 76) (TLC) located on a substrate material (10, 78). The apparatus uses a camera (50) to measure a reflected light (101) reflected by the TLC (12, 76) from a light source (54) which preferably illuminates the TLC with a full visible light spectrum (100). To achieve a temperature distribution over its surface the TLC (12, 76) is placed on a thermal element (14, 80) and allowed to reach a steady state. An optically transmissive pane (36) covers the TLC and contact assurance elements (38) which ensure contact pressure between the thermal element (14, 80) and the TLC. A set of optically transmissive plates (42, 44) mounted on top of one another and separated by air gap (46) covers the optically transmissive pane (36) and provides a thermal resistance to prevent heat leakage. The apparatus has a preferably ring-shaped light source (54) mounted above the set of optically transmissive plates (42, 44) for illuminating the TLC. For increased calibration accuracy the apparatus has an infrared filter (56) and an ultraviolet filter (58) mounted upstream from the light source (54) for removing ultraviolet and infrared radiation. Additionally, the apparatus has two polarizers (64, 66) to only admit circularly polarized light into the camera (50).

19 Claims, 3 Drawing Sheets

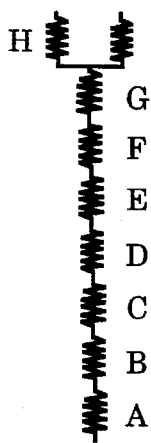
FIG. 4
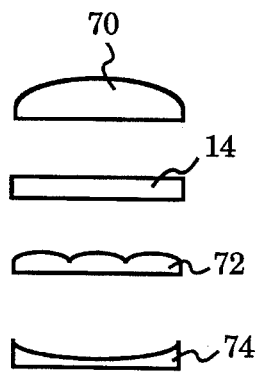
FIG. 5
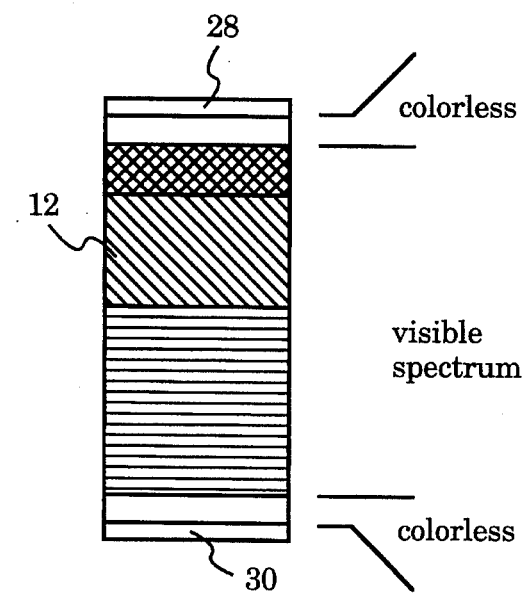
FIG. 6
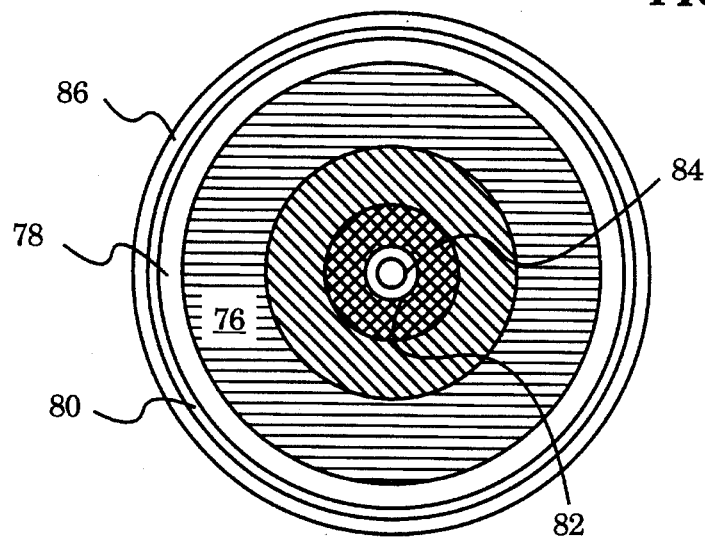
FIG. 7
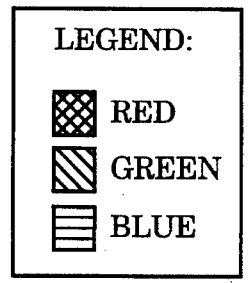

APPARATUS AND METHOD FOR FULL-FIELD CALIBRATION OF COLOR RESPONSE TO TEMPERATURE OF THERMOCHROMIC LIQUID CRYSTALS

BACKGROUND - FIELD OF THE INVENTION

The present invention relates to the field of thermochromic liquid crystals, and in particular to an apparatus and method for calibrating the color response of such crystals to temperature.

BACKGROUND - DESCRIPTION OF PRIOR ART

When illuminated by white light a thermochromic liquid crystal (TLC) will reflect a unique color component of that light depending on its temperature. As that temperature changes so does the color component of light reflected by the TLC. When the temperature drops below or exceeds the TLC's color play interval the TLC becomes transparent. This response is repeatable and reversible, thus rendering a TLC very useful for temperature measurements, e.g., as regular thermometers.

In practical uses, a TLC is usually encased in a protective material which shields it from harmful radiation, chemicals, and other degrading factors. In the encapsulated form (the capsules are usually 5–50 μm in diameter) a TLC can be suspended in a sprayable binder material and sprayed onto objects of various shapes or substrate materials which are then placed on objects. For example, a TLC can be applied to an entire surface of an object. The temperature distribution of that surface can then be easily monitored based on the TLC's color pattern. This kind of full-field measurement is extremely useful in practice, e.g., for tracing hot spots on elements exposed to thermal stress under operating conditions or indicating the temperature of a part which needs to be touched by a human operator.

However, to use TLCs as quantitative temperature sensors one has to first establish an accurate relation between the TLC's color and its temperature. The most common calibrating method is the successive isotherm technique. This method uses a series of full-field color images taken at successive temperature levels. The colors of these successive images are graphed against the temperature levels to obtain a calibration curve.

Clearly, this approach is extremely time consuming and tedious, especially if a large number of isotherms are used. It also requires continuous control and adjustment of the temperature of the TLC surface to ensure accurate measurements. Furthermore, the color response of the TLC between any two temperatures has to be approximated by interpolation. This can lead to an inaccurate calibration and poor resolution.

In addition, the perceived color of a TLC depends on the lighting/viewing arrangement, the color spectrum of light used for illumination, and the optical properties of the measurement path. The effect of the lighting/viewing arrangement is important because each point in a TLC image has a different lighting and viewing angle in a practical situation. This effect could require that a very cumbersome point-wise rather than a full-field calibration be used.

Furthermore, background light also affects the perceived color of a TLC. First, since the background light may have a different spectral distribution (e.g., contain different amounts of color components than the illuminating light), the effective illumination light is altered. Second, a significant fraction of the light reaching the camera for taking the image is reflected directly as gloss or glare. This light is not modified in its spectral content to contain the color of the TLC.

Thus it can be seen that an accurate, full-field calibration of a TLC color-to-temperature response is very complicated. In fact, there are no prior-art apparatus and/or methods known to the inventors to address the above calibration problems in a satisfactory manner.

OBJECTS AND ADVANTAGES OF THE INVENTION

In view of the above it is an object of the invention to provide an apparatus and a method for full-field calibration of the color response to temperature of a thermochromic liquid crystal. Further, it is an object of the invention to ensure that such apparatus provides high-accuracy results and thus enables a high resolution. Another object of the invention is to design the calibration apparatus to enable a continuous calibration without the necessity for performing any interpolations. Yet another object is for the method to be simple to practice and for the apparatus to be user-friendly. Finally, it is an object of the invention to provide the apparatus at low cost.

These and other objects and advantages will become more apparent after consideration of the ensuing description and the accompanying drawings.

SUMMARY OF THE INVENTION

The apparatus and method according to the invention are designed to accurately calibrate the full-field color response to temperature of a thermochromic liquid crystal which is conveniently located on a thermally conductive substrate material by measuring a reflected light from a visible light spectrum used to illuminate the thermochromic liquid crystal. To do this the apparatus has a heating bar for placing thereon the substrate material coated with the thermochromic liquid crystal and a set of thermal elements for applying a geometrically predetermined temperature distribution to the heating bar. An optically transmissive pane covers the thermochromic liquid crystal and a pressure maintenance means, preferably a set of springs, mounted on top of the optically transmissive pane, produces contact pressure between the heating bar and the thermochromic liquid crystal by pressing the thermochromic liquid crystal against the heating bar. A set of optically transmissive plates, mounted on top of one another and separated by air gaps, cover the optically transmissive pane and activate the pressing means. The apparatus has a ring-shaped light source mounted above the set of optically transmissive plates for illuminating the thermochromic liquid crystal with a light spectrum through the set of optically transmissive plates and the optically transmissive pane. Further, the apparatus has a light analyzing means, preferably a color camera, mounted above said set of optically transmissive plates for analyzing the reflected light.

For increased calibration accuracy the apparatus has a set of infrared and ultraviolet filters mounted upstream from the light source for removing ultraviolet and infrared radiation from the light spectrum used for illumination. The filters remove from the light source the light which carries thermal energy and energy degrading to the thermochromic liquid crystal. Additionally, the apparatus has two polarizing means, preferably two polarization plates, which are mounted in perpendicular orientation to each other over the light source and light analyzing means to only admit circularly polarized light into the light analyzing means.

The light source itself is preferably ring-shaped, in order to approximate a point-like source, and mounted concentrically around the light analyzing means or at a different spatial and angular position. The thermal elements produce a thermal gradient in the heating bar, which can exhibit various shapes, and the substrate material, preferably a conductor, ensures that the temperature of the thermochromic liquid crystal corresponds to that of the plate. To prevent heat transfer to the outside the set of optically transmissive plates have air gaps between them.

In the method of the invention the heating bar is impressed with a geometrical temperature distribution which varies sufficiently slowly, or remains constant, to provide a continuous calibration of the color-to-temperature response of the thermochromic liquid crystal. In the preferred embodiment the temperature is monitored with a set of thermocouple elements.

A detailed description of the apparatus and method of the invention is set forth below in reference to the enclosed drawing figures.

BRIEF DESCRIPTION OF THE DRAWINGS

FIG. 4 is a schematic diagram illustrating the equivalent thermal resistances of the portion of the preferred apparatus from FIG. 1.

FIG. 5 is a side view of four types of heating bars according to the invention.

FIG. 6 is a top view of the color distribution of the thermochromic liquid crystal during a calibration performed on a heating bar in the shape of a parallelepiped.

FIG. 7 is a top view of the color distribution of the thermochromic liquid crystal during a calibration performed on a disk-shaped heating bar.

DESCRIPTION

Figure 1:
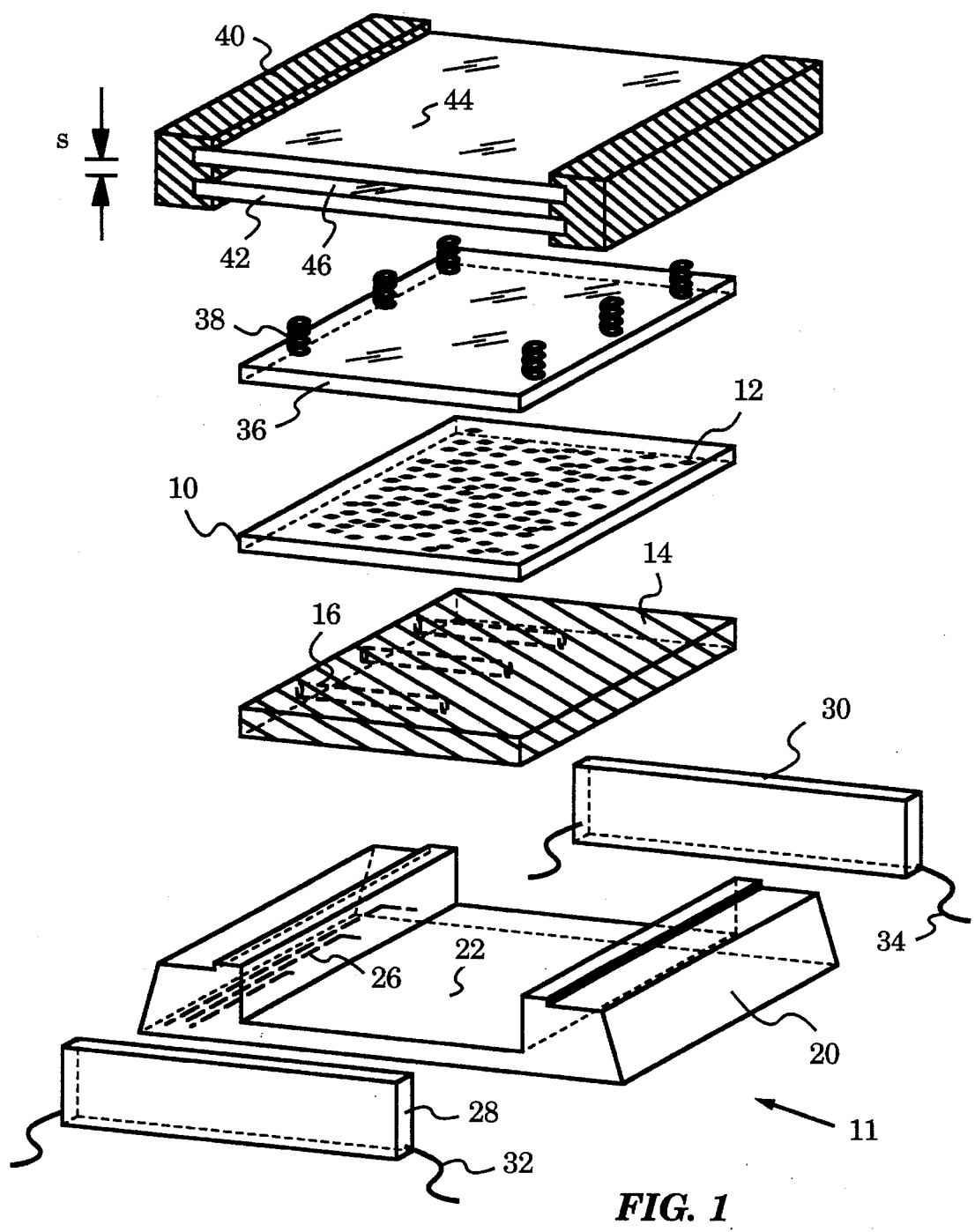
FIG. 1 is an exploded perspective view of a rig of the preferred apparatus of the invention for holding the thermochromic liquid crystal.

FIG. 1 shows an exploded perspective view of a rig 11 of the preferred calibration apparatus. A substrate material 10 in the form of a rectangular strip is covered with a thermochromic liquid crystal (TLC) 12. TLC 12 is preferably in the form of microcapsules 5–50 μm in diameter and is applied onto substrate material 10 by spraying, coating, immersing, or some other conventional process. Material 10 is preferably a thermal conductor, such as a conductive film, aluminium, Mylar®, or any other material onto which TLC 12 can be conveniently applied. Indeed, even nonconductive materials such as paper can be used in some cases.

Below substrate material 10 is located a heating bar 14 made of a thermally conducting material. In the preferred embodiment bar 14 is made of aluminium and it has the shape of a parallelepiped with dimensions 1.5×5×25 cm (height, width, length). Of course, a wide range of dimensions is allowable as long as they do not negatively influence the heat distribution in bar 14. Embedded inside bar 14 approximately along its center line is a set of standard thermocouples 16. Although FIG. 1 only shows three thermocouples 16 it is preferable to use a greater number, to provide better information about the temperature distribution in bar 14. For example, in the preferred embodiment nineteen 36-gauge, precision grade, type K thermocouples 16 are used. Each thermocouple is embedded in bar 14 using thermally conductive epoxy. Thermocouples 16 are designed to measure temperature to determine the geometrical temperature distribution in bar 14. Although thermocouples 16 shown in FIG. 1 are embedded along the center line, they can be embedded at various locations inside bar 14, e.g., along its sides.

Below bar 14 is located an insulating bed 20. Bed 20 is designed to receive bar 14 covered with substrate material 10 sprayed with TLC 12 inside a channel 22. Insulating bed 20 is made of a thermally insulating material, e.g., balsa wood, to insulate the lateral sides and the bottom of bar 14 from the surroundings. A set of wires 26 is used to guide the electrical signals from thermocouples 16 through the body of bed 20, and to an external electronic temperature measuring device (not shown). The temperature measuring device and other well-known electronic instruments (not shown) are used for monitoring the geometrical temperature distribution inside bar 14.

Two thermal elements 28 and 30 are located at the open ends of channel 22. Elements 28 are connected to conventional power sources (not shown) by sets of leads 32 and 34 respectively. Elements 28 and 30 can either both be regular rubber patch-style heaters or some other high-efficiency heating devices. The choice of suitable elements 28 and 30 depends on the temperature which is to be applied to the two ends of bar 14. Many stable, high-efficiency, conventional heaters capable of maintaining a set temperature are commercially available. In the preferred embodiment, element 28 is a rubber patch-style heater and element 30 is a water-cooled aluminium heat sink. The temperature of element 30 is held constant by using a bulk water pre-heater (not shown) and a second patch heater (not shown). This arrangement enables element 30 to efficiently remove the heat conducted by bar 14 from element 28.

An optically transmissive pane 36 is dimensioned to fit inside channel 22 and cover TLC 12. Pane 36 is made of a low-reflectivity glass or other optical material which reduces glare. A set of coil springs 38 is affixed along the edges of pane 36.

A frame 40 holding a set of two optically transmissive plates 42 and 44 with a gap 46 between them is positioned above pane 36. In the preferred embodiment gap 46 contains air and its width s is sufficient to provide a thermal buffer between plates 42 and 44. Both plates 42 and 44 are made of low-reflectivity glass or similar material.

Figure 2:
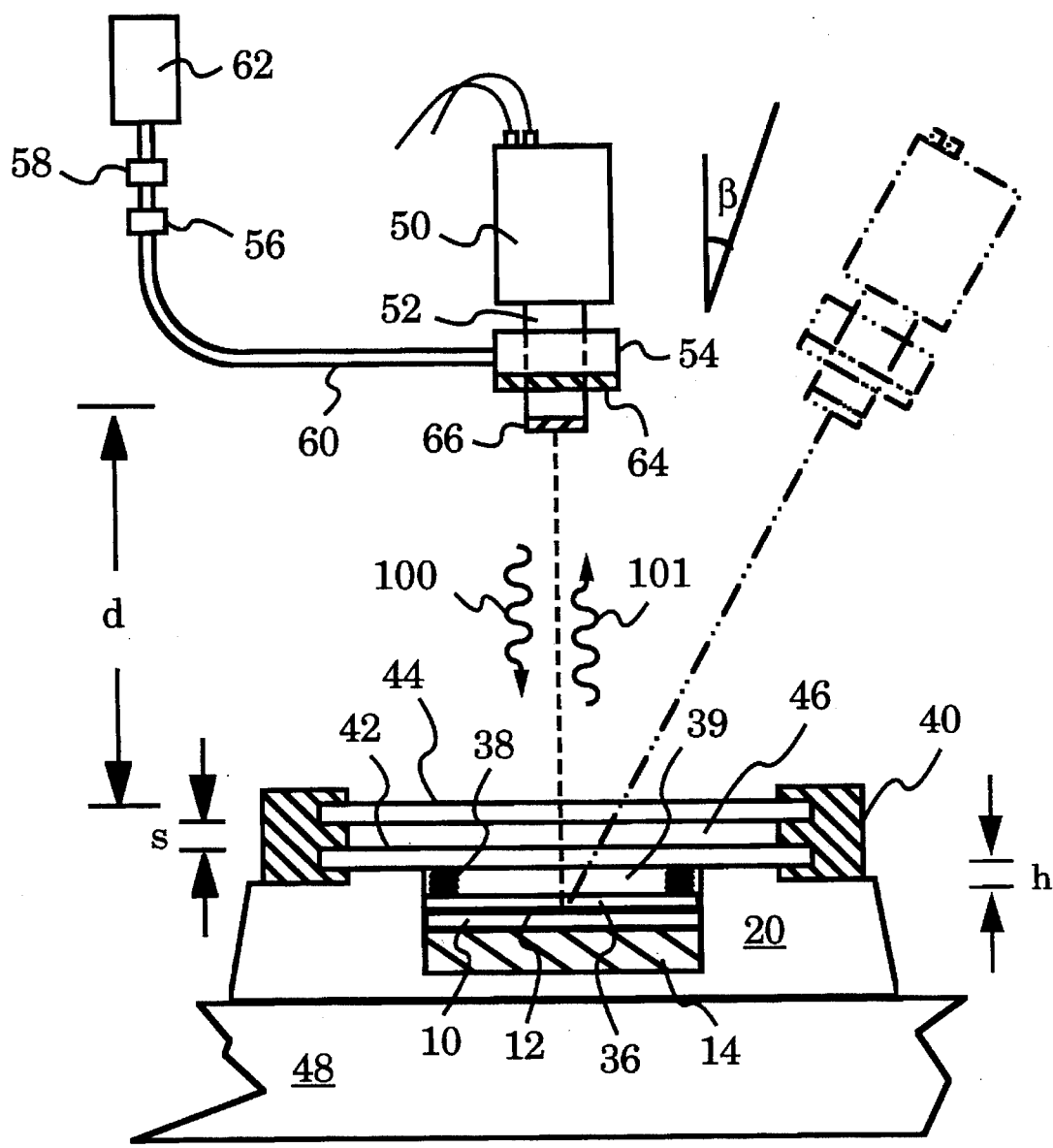
FIG. 2 is a side view of the entire preferred apparatus according to the invention.

As illustrated in FIG. 2, the surface of bottom plate 42 is designed to press against springs 38 to push pane 36 against TLC 12 when frame 40 is in position on top of insulating bed 20. Fastening elements (not shown) can be provided to hold frame 40 in place on bed 20 to ensure that frame 40 fits snug against bed 20 and plate 42 compresses springs 38. The pressure produced by springs 38 keeps TLC 12 coated on material 10 in good thermal contact with bar 14. Also, when springs 38 are properly compressed, an air gap 39 of width h is left between pane 36 and plate 42.

Further, FIG. 2 shows the rig 11 of the preferred calibrating apparatus resting on a rigid support 48. In the preferred embodiment support 48 is pivotable to permit adjustment of the inclination of rig 11.

A color camera 50 with an objective 52 is positioned directly above rig 11 at a distance d from the surface of plate 44. A ring-shaped light source 54 is mounted around objective 52. Light source 54 is designed to deliver a visible light spectrum 100. In the preferred embodiment spectrum 100 is free of infrared and ultraviolet light, which is filtered out by an infrared filter 56 and an ultraviolet filter 58 mounted inside a light guiding duct 60. A primary light source 62 is connected to duct 60 upstream from filters 56 and 58. Source 62 can be any light source capable of delivering a full and uniform spectrum of at least the visible light. In the preferred embodiment source 62 is a 3200K white light source.

Camera 50 is a high-resolution camera capable of distinguishing fine differences in color, e.g., Sony DXC-151 RGB/CCD. Further, camera 50 is capable of acquiring full-field red-blue-green (RGB) images at 640×480 pixel resolution at 30 frames per second. In the preferred embodiment distance d is approximately 50 cm. However, various calibration distances can be chosen depending on the type of calibration desired and the size of rig 11. Also, camera 50 can be oriented at an angle β to the surface of plate 44 to receive a reflected light 101 from TLC 12 at angle β, as shown in dashed lines.

Figure 3:
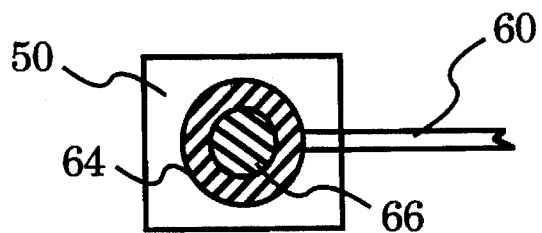
FIG. 3 is a plan bottom view of the color camera and light source from FIG. 2 equipped with polarizers according to the invention.

A ring-shaped polarizer 64 covers light source 54. Polarizer 64 is a conventional linear polarizer. A similar but circular polarizer 66 covers objective 52 of camera 50. The axis of polarization of polarizer 66 is perpendicular to the axis of polarization of polarizer 64. This arrangement is more clearly shown in FIG. 3 in plan view.

For better understanding of the thermal conditions inside rig 11 FIG. 4 illustrates a series of thermal resistances corresponding to the total thermal resistance between heating bar 14 and the top of plate 44. A is the thermal resistance of heating bar 14, B is the contact resistance between heating bar 14 and substrate material 10 sprayed with TLC 12, C is the contact resistance between TLC 12 and pane 36, D is the thermal resistance of air gap 39, E is the thermal resistance of plate 42, F is the thermal resistance of air gap 46, G is the thermal resistance of plate 44, and H is the parallel resistance to the surroundings and to zero reference at infinity. While the thermal resistance A+B+C is relatively small, the thermal resistance D+E+F+G+H is relatively large, since pane 36, plates 42, 44 are made of glass which is a thermal insulator, and air gaps 39 and 46 are also thermal insulators. The significance of this situation will be explained further below.

FIG. 5 shows in side view of three possible variations to heating bar 14 in the form of plates 70, 72, 74. Of course, suitable alterations to bed 20 and pane 36 are necessary to accommodate concave- and convex-shaped plates 70, 72, 74.

FIG. 6 shows the color response of TLC 12 to a linear temperature distribution along bar 14. Similarly, FIG. 7 illustrates the color response of a TLC 76 coated on a circular substrate material 78 to a heating plate 80 which is disk-shaped. A bore 82 holding a thermal element 84 is located in the center of plate 80. A thermal element 86 contacts plate 80 along its circumference.

OPERATION

According to FIG. 1, in practicing the method of the invention heating bar 14 is first placed in position in channel 22 of rig 11. Then TLC 12 on substrate material 10 is placed on top of bar 14. To ensure good thermal contact between TLC 12 and bar 14 pane 36 is placed on top of TLC 12. Springs 38 of pane 36 are subsequently compressed by placing frame 40 with plates 42 and 44 on top of bed 20. In this position pane 42 presses down on springs 38. Consequently, pane 36 exerts pressure against TLC 12 ensuring good thermal contact with bar 14.

Once rig 11 is prepared as described above, thermal elements 28 and 30 are set to two different temperatures and turned on. Typically, for calibrating a TLC with a narrow color play interval the difference in temperature between thermal elements 28 and 30 can be as low as a fraction of a degree, e.g. 30.1° C. to 30.9° C. On the other hand, TLCs with a wide color play interval may require a temperature difference of several tens of degrees Celcius, e.g., 30° C. to 70° C., to demonstrate their entire range of color response. The preferred rig 11 can be used in both cases.

After setting the required temperature range for TLC 12 rig 11 is allowed to reach a steady state in which the temperature distribution in bar 14 no longer varies with time. This usually lasts 30 to 45 minutes and can be verified by monitoring the temperature measured by thermocouples 16. Because of good thermal contact between bar 14 and TLC 12 the latter has the same temperature distribution as bar 14. Of course, if a difference in temperature does exist between bar 14 and TLC 12 a correction factor can be introduced to compensate for it. In the preferred embodiment the steady-state temperature distribution is span-wise uniform, because of the shape of bar 14 and position of elements 28 and 30, and varies linearly from one end of bar 14 to the other.

The heat generated in heating TLC 12 is contained inside rig 11 because of air gap 39, plate 42, air gap 46, and plate 44. This effect is best explained with the aid of FIG. 4 which shows the thermal resistances of all the above elements. Since resistance A of bar 14, resistance B between bar 14 and material 10 sprayed with TLC 12, and resistance C between TLC 12 and pane 36 are all relatively small, heat is easily transferred between these elements. Thus, bar 14, TLC 12, and pane 36 exhibit virtually the same temperature distribution. Meanwhile, resistance D of air gap 39, resistance E of plate 42, resistance F of air gap 46, resistance G of plate 44, and parallel resistance H to the surroundings and to zero reference at infinity are very much larger than resistance A+B+C. Consequently, these last elements act as thermal buffers and ensure that only a negligible amount of heat is leaked to the outside of rig 11.

As shown in FIG. 2, ring-shaped light source 54 illuminates TLC 12 from distance d at an angle normal to rig 11 with visble light spectrum 100. In the preferred embodiment the angle of illumination β can be adjusted by rotating source 54 together with camera 50 as indicated by the phantom lines. Also, the angle of illumination can be varied by tilting pivotable support 48. Distance d is selected to be large enough for light source 54 to appear as a point source at the location of TLC 12. In the preferred embodiment this distance is approximately 50 cm for a light source 54 of approximately 7 cm in diameter. In making a calibration measurement angle β and distance d are selected to best reflect the field illumination conditions under which TLC 12 will be used.

Primary light source 62 delivers light, which contains at least visible light spectrum 100, to source 54. The ultraviolet portion of the light, which is harmful to TLC 12, and the infrared portion, which carries undesirable thermal energy, are filtered out by ultaviolet filter 58 and infrared filter 56 respectively. The remaining visible light spectrum 100 is delivered to source 54 by light guiding duct 60. Finally, when exiting source 54 on the way to TLC 12, the light of spectrum 100 is polarized by polarizer 64.

Because plates 44 and 42, as well as pane 36 are made of a low-reflectivity glass most of spectrum 100 from source 54 is transmitted to the surface of TLC 12. Here, the different regions of TLC 12 exhibiting different temperatures (according to the temperature distribution) reflect different color portions of spectrum 100 from source 54. This is best shown by FIG. 6. The ends of TLC 12 near thermal elements 28 and 30 turn transparent because the end temperatures exceed the color play interval of TLC 12. Meanwhile, in the middle of TLC 12 relfected light 101 spans the entire visible light spectrum. In addition to reflecting different colors of light TLC 12, by its nature (chirality), also rotates reflected light 101 to impart it with a circular polarization.

The circularly polarized, reflected light 101 travels back up through pane 36, gap 39, plates 42, gap 46, and plate 44 to color camera 50. Before entering objective 52 light 101 passes through polarizer 66. Since the axis of polarization of polarizer 66 is perpendicular (crossed) with the axis of polarization of polarizer 64, only circularly polarized, reflected light 101 is admitted inside objective 52. This ensures that only light originating from source 54 and reflected by TLC 12 will be measured by camera 50. That, in turn, reduces calibration errors due to stray light which might otherwise enter objective 52.

Camera 50 resolves light 101 into a fine color range to calibrate the color/temperature response of TLC 12 over its color play interval. Suitable computers and electronic image processing devices (not shown) can be used in this process according to well known image processing techniques.

The method of the invention is also advantageously employed with heating bars of different shapes, as shown in FIG. 5. In these cases the remaining elements of rig 11 are adapted to the geometry of bar 70, 72, and 74. The advantage of using the apparatus and method of the invention with non-planar surface bars 70, 72, and 74 is the ability of collecting color response data at various angles at the same time. This is frequently more indicative of actual field conditions under which a TLC is viewed.

Finally, FIG. 7 shows another embodiment of the invention in which TLC 76 is coated on a circular substrate material 78 placed on a heating plate 80 with is disk-shaped. This embodiment operates analogously to the previous ones, but the temperature gradient is set up radially. For example, thermal element 84 located at the center of plate 80 is set at a higher temperature. Meanwhile, thermal element 86 located along the circumference of plate 80 is set at a lower temperature. Upon reaching steady state the resulting temperature gradient is radially symmetric, as shown.

SUMMARY, RAMIFICATIONS, AND SCOPE

Described above is a calibration apparatus for full-field calibration of thermochromic liquid crystals and a method for performing such calibrations which is very accurate and allows a high resolution of the color response. In fact, this resolution is mostly limited by the equipment used to process the color image of the TLC and not the apparatus. The apparatus makes it possible to carry out a continuous calibration without the necessity for performing any interpolations to estimate the color response at temperatures which were not measured. The method of the invention is simple to practice and the apparatus is user-friendly and economical.

Many alterations can be made to the apparatus presented above within the scope and in the spirit of the invention. For example, other than ring-shaped light sources can be employed. Preferably, these light sources will resemble a point source from the point of view of the TLC. These light sources can use limited ranges of the visible light spectrum for testing only particular color play intervals of the TLC.

Furthermore, the light source does not need to be mounted around the objective of the camera. In fact, the camera can be positioned to receive the reflected light at a completely different distance and angular orientation than the light source. This is very useful for calibrating TLCs which will be viewed at an angle appreciably different from the angle of illumination. Finally, the number of transmissive plates and air gaps between the surface of the TLC and the exterior of the rig can be changed. More air gaps will ensure better thermal insulation, provided they are calculated to of such width as to prevent convection.

Therefore, the scope of the invention should be determined, not by examples given, but by the appended claims and their legal equivalents.

We claim:

1. An apparatus for calibrating the full-field color response to temperature of a thermochromic liquid crystal located on a substrate material by measuring a reflected light of a visible light spectrum used to illuminate said thermochromic liquid crystal, said apparatus comprising:

a) a heating bar with said thermochromic liquid crystal placed thereon for applying a geometrically predetermined temperature distribution to said thermochromic liquid crystal;

b) a set of thermal elements in thermal contact with said heating bar for creating said geometrically predetermined temperature distribution;

c) an optically transmissive pane for covering said thermochromic liquid crystal;

d) pressing means mounted on top of said optically transmissive pane for producing contact pressure between said optically transmissive pane and said thermochromic liquid crystal;

e) a set of optically transmissive plates, mounted on top of one another and separated by air gaps, for covering said optically transmissive pane and activating said pressing means and for providing thermal insulation between said thermochromic liquid crystal and the surroundings;

f) a light source mounted at a predetermined distance from said set of optically transmissive plates for illuminating said thermochromic liquid crystal with said visible light spectrum through said set of optically transmissive plates and said optically transmissive pane; and g) a light analyzing means, mounted above said set of optically transmissive plates, sensitive to said reflected light.

2. The apparatus of claim 1 further comprising a set of infrared and ultraviolet filters mounted upstream from said light source for removing ultraviolet and infrared radiation from said light spectrum, thereby removing from said light source Substantially all light carrying thermal energy and energy degrading to said thermochromic liquid crystal.

3. The apparatus of claim 2 further comprising:

a) a first polarizing means with a predetermined axis of polarization mounted on said light source;

b) a second polarizing means with a predetermined axis of polarization mounted on said light analyzing means and oriented substantially perpendicular to the predetermined axis of polarization of said first polarizing means, whereby only circularly polarized light passing through said first polarizing means can be passed through said second polarizing means.

4. The apparatus of claim 1 wherein said light source is ring-shaped.

5. The apparatus of claim 1 wherein said light source is ring-shaped and mounted concentrically around said light analyzing means, whereby said light spectrum issuing from said ring-shaped light source is collinear with said reflected light received by said light analyzing means.

6. The apparatus of claim 1 wherein said light source and said light analyzing means are mounted at different spatial and angular positions above said thermochromic liquid crystal.

7. The apparatus of claim 1 wherein said heating bar has the shape of a parallelepiped and said set of thermal elements comprises two thermal elements mounted substantially at two opposite sides of said heating bar.

8. The apparatus according to claim 7 wherein said two thermal elements are impressed with two different temperatures, thereby setting up a temperature gradient between the two opposite sides of said heating bar to produce said geometrically predetermined temperature distribution.

9. The apparatus of claim 1 wherein said heating bar has the shape of a disk and said set of thermal elements comprises two thermal elements, one mounted substantially in the middle of said heating bar and one mounted along the circumference of said heating bar.

10. The apparatus according to claim 9 wherein said two thermal elements are maintained at two different temperatures, thereby setting up a radial temperature gradient between the center of said heating bar and the circumference of said heating bar to produce said geometrically predetermined temperature distribution.

11. The apparatus of claim 1 wherein said heating bar has a curved surface and said set of thermal elements comprises two thermal elements mounted substantially at two opposite sides of said heating bar.

12. The apparatus according to claim 11 wherein said two thermal elements are maintained at two different temperatures, thereby maintaining a span-wise uniform temperature and setting up a temperature gradient between the two opposite sides of said heating bar to produce said geometrically predetermined temperature distribution.

13. The apparatus of claim 1 wherein said substrate material is a thermal conductor.

14. The apparatus of claim 1 wherein said set of optically transmissive plates comprises two optically transmissive plates and one gap between said plates, said gap containing air.

15. The apparatus of claim 14 wherein said pressing means comprise a set of springs actuated by the pressure exerted by one of said two optically transmissive plates.

16. A method for calibrating the full-field color response to temperature of a thermochromic liquid crystal located on a substrate material by measuring a reflected light of a visible light spectrum used to illuminate said thermochromic liquid crystal, said method comprising:

a) placing said thermochromic liquid crystal on a heating bar;

b) applying a geometrically predetermined temperature distribution to said heating bar using a set of thermal elements in contact with said heating bar;

c) covering said thermochromic liquid crystal with an optically transmissive pane;

d) assuring contact between said thermochromic liquid crystal and said heating bar using a pressing means for producing contact pressure between said optically transmissive pane, said thermochromic liquid crystal, and said heating bar;

e) mounting over said optically transmissive pane a set of optically transmissive plates, arranged on top of one another and separated by air gaps to thermally insulate said thermochromic liquid crystal from the surroundings;

f) exerting pressure on said optically transmissive pane;

g) activating said pressing means by exerting pressure on said pressing means;

h) illuminating said thermochromic liquid crystal with said visible light spectrum through said set of optically transmissive plates and said optically transmissive pane using a light source mounted at a predetermined distance above said set of optically transmissive plates; and i) analyzing said reflected light with light analyzing means mounted above said set of optically transmissive plates.

17. The method of claim 16 wherein said analyzing step comprises analyzing the entire spectrum of said reflected light simultaneously, thereby providing continuous calibration of said thermochromic liquid crystal.

18. The method of claim 16 further comprising:

a) eliminating infrared and ultraviolet light from said visible light spectrum, thereby removing from said light source substantially all light carrying thermal energy and energy degrading to said thermochromic liquid crystal; and b) admitting into said light analyzing means only a circularly polarized part of said reflected light.

19. The method of claim 16 additionally comprising the following step:

measuring whether said geometrically predetermined temperature distribution in said heating bar is constant in time using a set of thermocouples; and wherein said step of analyzing said reflected light includes analyzing said reflected light when said geometrically predetermined temperature distribution is constant in time.

* * * * *